US011566659B2

(12) United States Patent
Moffatt et al.

(10) Patent No.: US 11,566,659 B2
(45) Date of Patent: Jan. 31, 2023

(54) MANIKIN WITH ARTICULATED JOINT

(71) Applicant: SANDON QLD PTY LTD, Ipswich (AU)

(72) Inventors: Brendon Jay Moffatt, Ipswich (AU); Sandra Jaye Moffatt, Ipswich (AU); Daniel Peter Freund, Ipswich (AU); Christopher Graham Conway Lamb, Brisbane (AU)

( * ) Notice: Subject to any disclaimer, the term of this patent is extended or adjusted under 35 U.S.C. 154(b) by 1012 days.

(21) Appl. No.: 16/328,253

(22) PCT Filed: Aug. 26, 2016

(86) PCT No.: PCT/AU2016/050789
§ 371 (c)(1),
(2) Date: Feb. 25, 2019

(87) PCT Pub. No.: WO2018/035550
PCT Pub. Date: Mar. 1, 2018

(65) Prior Publication Data
US 2019/0285112 A1 Sep. 19, 2019

(51) Int. Cl.
*G09B 23/30* (2006.01)
*F16C 11/06* (2006.01)
*A47F 8/00* (2006.01)
*A63H 3/16* (2006.01)
*A63H 3/46* (2006.01)
*G09B 23/32* (2006.01)
*F16C 11/04* (2006.01)

(52) U.S. Cl.
CPC .............. *F16C 11/06* (2013.01); *A47F 8/00* (2013.01); *A63H 3/16* (2013.01); *A63H 3/46* (2013.01); *F16C 11/04* (2013.01); *G09B 23/32* (2013.01)

(58) Field of Classification Search
CPC .......... G09B 23/28; G09B 23/30; A63H 3/36; A63H 3/46; F16C 11/06; F16C 11/0614
See application file for complete search history.

(56) References Cited

U.S. PATENT DOCUMENTS

| 1,289,385 A | 12/1918 | Cabana |
| 1,359,030 A | 11/1920 | Cabana |
| 2,129,421 A | 9/1938 | Hales |

(Continued)

FOREIGN PATENT DOCUMENTS

| CN | 2495003 Y | 6/2002 |
| CN | 1646199 A | 7/2005 |

(Continued)

*Primary Examiner* — Kurt Fernstrom
(74) *Attorney, Agent, or Firm* — David A. Roise; VLP Law Group LLP

(57) ABSTRACT

A manikin (1) comprising jointed body parts that are configurable to (1) closely mimic natural movement of corresponding body parts of a real baby and/or (2) closely mimic a range of poses or postures of a real baby. The baby manikin (1) includes a neck joint (11) (articulated ball and socket joint), a waist joint (12) (articulated ball and socket joint), a hip joint (13) (double ball and socket joint), two knee joints (14) (pin joints), two ankle joints (15) (articulated ball and socket joints), two shoulder joints (16) (double ball and socket joints), two elbow joints (17) (pin joints), and two wrist joints (18) (articulated ball and socket joints).

10 Claims, 12 Drawing Sheets

(56) References Cited

U.S. PATENT DOCUMENTS

| | | | | |
|---|---|---|---|---|
| 3,628,282 A * | 12/1971 | Johnson | ............ | A63H 3/46 446/378 |
| 3,921,332 A * | 11/1975 | Terzian | ............ | A63H 3/46 446/380 |
| 3,940,880 A * | 3/1976 | Kaelin | ............ | A63H 3/46 446/381 |
| 4,696,656 A * | 9/1987 | Torres | ............ | A63H 33/003 446/376 |
| 4,723,932 A * | 2/1988 | Kelley | ............ | A63H 3/20 446/376 |
| 4,968,282 A * | 11/1990 | Robson | ............ | A63H 3/46 446/376 |
| 6,089,950 A * | 7/2000 | Lee | ............ | A63H 3/46 446/376 |
| 6,537,130 B1 * | 3/2003 | Lee | ............ | A63H 3/04 446/485 |
| 6,537,131 B1 * | 3/2003 | Larian | ............ | A63H 3/46 446/376 |
| 6,607,684 B1 * | 8/2003 | Lee | ............ | B29C 45/14467 264/250 |
| 6,692,332 B2 | 2/2004 | Jheow | | |
| 6,991,510 B2 * | 1/2006 | Nan | ............ | A47F 8/00 446/220 |
| 7,021,989 B2 * | 4/2006 | Wai | ............ | A63H 3/46 446/379 |
| 7,077,717 B2 * | 7/2006 | Cheng | ............ | A63H 3/46 446/376 |
| 8,834,225 B2 * | 9/2014 | Ferron | ............ | A63H 3/46 446/124 |
| 9,067,147 B1 * | 6/2015 | Woodhouse | ............ | A63H 3/46 |
| 9,849,396 B2 * | 12/2017 | Kimura | ............ | A63H 3/46 |
| 10,559,228 B2 * | 2/2020 | Rodriguez | ............ | G09B 23/288 |
| 2003/0162477 A1 | 8/2003 | Jheow | | |
| 2007/0060011 A1 * | 3/2007 | Daftari | ............ | A63H 3/46 446/97 |
| 2012/0096960 A1 * | 4/2012 | Galbreath | ............ | G01M 7/025 73/866.4 |
| 2013/0186922 A1 * | 7/2013 | Soto Velasco | ............ | A47F 8/02 223/66 |
| 2018/0111056 A1 * | 4/2018 | Baker | ............ | A63H 3/003 |

FOREIGN PATENT DOCUMENTS

| | | |
|---|---|---|
| FR | 2719455 A1 | 11/1995 |
| KR | 1020090112917 A | 10/2009 |

* cited by examiner

MANIKIN WITH ARTICULATED JOINT

CROSS-REFERENCE TO RELATED APPLICATIONS

This application is a national phase application of PCT International Application No. PCT/AU2016/050789, filed on Aug. 26, 2016, the disclosure of which is incorporated herein by reference in its entirety.

TECHNICAL FIELD

In one aspect, the present invention relates to an articulated joint for a manikin. In another aspect, the invention concerns a manikin having articulated joints, wherein body parts of the manikin are configurable to (1) closely mimic natural movement of corresponding body parts of a real person and/or are (2) configurable to closely mimic a range of poses or postures of a real person, and can be used in situations where using a real person would be impractical or inconvenient.

BACKGROUND ART

It will be clearly understood that, if a prior art publication is referred to herein, this reference does not constitute an admission that the publication forms part of the common general knowledge in the art in Australia or in any other country.

Baby dolls and manikins having jointed body parts are known. Baby dolls for children are usually play items and, although they may have some jointed body parts, those jointed body parts are not designed to closely mimic natural body part movements of a real baby nor be configured to closely mimic a range of poses or postures of a real baby.

Baby manikins are usually designed for specific purposes, such as training aids for health practitioners or soon-to-be parents, and likewise their jointed body parts are not designed to closely mimic natural body part movements of a real baby nor closely mimic a range of poses or postures of a real baby.

Moreover, manikins in general are designed for a specific purpose in mind and, to the inventors' knowledge, that would not normally entail the manikins being designed to closely mimic natural body part movements of a real person nor closely mimic a range of poses or postures of a real person.

DETAILED DESCRIPTION OF THE INVENTION

In one aspect, the inventors have developed an articulated joint for a manikin. In another aspect, the inventors have developed a manikin having one or more articulated joints, wherein body parts of the manikin are configurable to closely mimic natural body part movements of a real person or are configurable to closely mimic a range of poses or postures of a real person, and can be used in situations where using a real person would be impractical or inconvenient.

With the foregoing in view, the present invention in a first aspect resides broadly in an articulated joint for a manikin, for joining or when joining first and second body parts of the manikin together, wherein the first and second body parts when connected by the joint are configurable to (1) closely mimic natural movement of corresponding first and second body parts of a real person and/or (2) closely mimic a range of poses or postures of a real person.

According to a second aspect of the present invention there is provided an articulated joint for a manikin, wherein the joint comprises:

a ball member comprising a ball with a shaft extending from opposed sides thereof, wherein the shaft is connect to, connectable to or part of a first body part of a manikin; and a socket connected, connectable to or part of a second body part of a manikin, wherein the socket comprises a socket housing within which the ball member moves, and the socket housing has at least one opening through which the shaft extends, wherein:

the socket housing limits movement of the shaft in certain axes such that the first and second body parts are configurable to (1) closely mimic natural movement of corresponding first and second body parts of a real person and/or (2) closely mimic a range of poses or postures of a real person; and, optionally a shape of the first body part and/or a shape of the second body part further limit movement of the first and second body parts relative to each another such that the first and second body parts are configurable to (1) closely mimic natural movement of the corresponding first and second body parts of a real person and/or (2) closely mimic a range of poses or postures of a real person.

According to a third aspect, there is provided a manikin comprising two or more body parts connected together using the articulated joint according to the first or second aspects, or a manikin comprising jointed body parts that are configurable to (1) closely mimic natural movement of corresponding body parts of a real person and/or (2) closely mimic a range of poses or postures of a real person.

According to a fourth aspect, there is provided a method of constructing a manikin, said method comprising the step of connecting together body parts of the manikin using the articulated joint of the first or second aspect.

According to a fifth aspect, there is provided use of the manikin of the third aspect as a training or educational tool.

According to a sixth aspect, there is provided a training or educational method, said method comprising the step of: using the manikin of the third aspect for training or an educational purpose rather than a real person (in place of a real person).

The term "manikin" (also spelt mannikin and mannequin) as used herein refers to a jointed model of the human body and can include, but is not limited to, a dummy, model, doll or training aid.

By "closely mimic natural movement of corresponding first and second body parts of a real person" or "closely mimic natural movement of corresponding body parts of a real person" it is meant that those body parts would appear to substantially track natural body part movement, although perhaps not identically and not always the exact same range of movement.

By "closely mimic a range of poses or postures of a real person" it is meant that those body parts could preferably adopt a large range of poses or postures. Some of the poses or postures are illustrated in the figures of this specification. Preferably a large range of poses or postures can be adopted, including but not exclusively as shown in the figures (especially FIGS. 1, 2, 3 11, 18 and 19).

Any of the features described below can, context allowing, refer to any one of the first to sixth aspects of the invention described above.

With regard to the second aspect, the ball can be of any suitable size, shape and construction, and can be made of any suitable material or materials. Preferably the ball is spherical or substantially spherical. The ball can be made of metal or plastics material, for example.

The shaft can be of any suitable size, shape and construction, and can be made of any suitable material or materials. The shaft can be of integral construction with the ball or can be a separate piece that is connectable to the ball (eg. by way of friction-fit or screw thread). The shaft can be made of metal or plastics material, for example. In an embodiment, the shaft and ball can be made of moulded plastic, as a single piece.

The shaft can extend as a single piece completely through the ball or there could be separate shaft pieces. A first end of the shaft can extend from a surface of the ball and a second end of the shaft can extend from an opposed surface of the ball. The first and second shaft ends can extend along a common axis.

In some embodiments the shaft, or one or both ends thereof, can be connected to, connectable to, or of unitary construction with the first body part.

In some embodiments the shaft, or one or both ends thereof, can be a rod, pin, projection or other type of male formation of solid cross-section. In these embodiments the rod, pin, projection or other type of male formation can engage one or more openings, holes, recesses, channels, grooves or female formations in the first body part.

In other embodiments the shaft or one or more ends thereof can be of unitary construction with the first body part. For example, they may be formed by moulding or machining.

In yet other embodiments the shaft, or one or both ends thereof, can be of hollow cross-section or contain a passage. That is, in some embodiments, if hollow or containing one or more passages, the shaft or one or both ends thereof can receive a pin, threaded fastener or other type of mounting pin or device so as to connect the shaft or one or both ends thereof to the first body part. In a preferred embodiment the mounting pin is an interscrew that extends completely through the shaft and pins both shaft ends to the first body part.

In other embodiments, if hollow or containing one or more passages, the shaft or one or both ends thereof can hold a biased plunger, rod, pin, projection or other type of male formation such that the plunger, rod, pin, projection or other type of male formation can be extended from a retracted position so as to engage a hole, recess, channel, groove or other type of female formation in the first body part so as to hold the ball member in place. The bias can be provided by a spring, rubber, other type of elastomeric material or pneumatic device, for example. In a preferred embodiment, each end of the shaft can hold a spring-biased plunger or pin which can extend from a retracted position (ie. retracted against the force of the spring) within a respective opening in the first body part, so as to hold the ball member in place.

The socket or parts thereof can be made of any suitable material or materials. For example, the socket or parts thereof can be made of moulded silicone rubber, plastics material or metal, such as stainless steel. The socket can be of unitary construction or separate connectable pieces.

The socket housing can comprise at least one wall. The wall can be spherical, substantially spherical or round. The socket housing can comprise an inner surface and an outer surface. The ball member can be in direct contact with an inner spherical surface of the socket housing. The socket housing can have a detachable closure (eg. cover or flap) such that the ball member can be placed within the socket housing. The closure can be attached to a remainder of the socket housing in any suitable way—eg. snap-fit or threaded fastener/s.

The at least one opening in the socket housing through which the shaft extends can be of any suitable size and shape so as to limit movement of the shaft in certain axes. The opening can be circular or generally circular, for example, but this need not be the case.

The socket housing can have a first opening through which one of the shaft ends extends and a second opening through which a second shaft end extends. The first and second openings can be situated at opposed sides of the socket housing. The size and the shape of the openings can dictate the degree of movement allowed by the ball member. That is, the socket housing opening limits the travel of that shaft in certain axes. By tuning the geometry of the shaft and socket housing opening it is possible to design in the desired amount of joint travel in all axes.

In some embodiments, the first and second openings are not of sufficient size to allow insertion of the ball of the ball member into the socket housing, in which case the socket housing would need a removable closure or would otherwise need to be assembled from two or more pieces. In other embodiments, the ball member can be squeezed into the socket housing via one or more of the openings. In some embodiments one or both openings can be of sufficient size to allow insertion of the ball of the ball member into the socket housing. In some embodiments only one of the openings is of sufficient size to allow insertion of the ball of the ball member into the socket housing.

The socket can be connected to, connectable to, or of unitary construction with the second body part.

In some embodiments the socket or socket housing can be connected or connectable to the second body part using a connecting mechanism or device, such interlocking male and female formations or a locking pin, for example. Alternatively, the socket or socket housing can friction fit within the second body part or can be received within a cavity or recess of the second body part.

In some embodiments the socket or socket housing or part thereof can be of unitary construction with the second body part. For example, they may be formed by moulding (eg. plastics or silicone rubber) or machining.

In some embodiments the socket can comprise a body part insert, such as a shaft, rod or pin, that extends from the socket housing and can be extended within or incorporated into the second body part. The shaft, rod or pin can be straight or bent. The shaft, rod or pin can be threaded or not. The shaft, rod or pin can be made of stainless steel, for example.

The manikin can comprise any suitable types and number of body parts, but will typically comprise a head (optionally with or without a neck), an upper torso (chest and neck), a lower torso (waist and buttock), a pair of upper arms, a pair of forearms, a pair of upper legs, a pair of lower legs, a pair of hands, and a pair of feet.

The articulated joint can join any suitable types of body parts together, including one or more of the following: (1) the head and upper torso; (2) the upper torso and lower torso; (3) each forearm and each hand; and (4) each lower leg and each foot.

Put another way, the articulated joint can be used for one or more of the following: (1) a neck joint; (2) a waist joint; (3,4) each wrist joint; and (5,6) each ankle joint.

In an embodiment, the head can be the first body part and the upper torso can be the second body part. In an embodiment, the upper torso can be the first body part and the lower torso can be the second body part. In an embodiment each hand can be the first body part and each forearm can be the second body part. In an embodiment, each foot can be the first body part and each lower leg can be a second body part.

As mentioned, the shape of the first body part and/or the shape of the second body part can further limit movement of the first and second body parts relative to each another such that the first and second body parts are configurable to (1) closely mimic natural movement of corresponding first and second body parts of a real person and/or (2) closely mimic a range of poses or postures of a real person. For example, the head and upper torso can be shaped for this purpose, the upper torso and lower torso can be shaped for this purpose, each forearm and each hand can be shaped for this purpose, and/or each lower leg and each foot can be shaped for this purpose.

The body parts can be made of any suitable material or materials. Examples of suitable materials include moulded plastics material, wood, foam rubber and/or moulded silicone rubber. Each body part can comprise one or more reinforcing materials, supports, inserts, elements or framework, such as plastic or metal reinforcing materials, supports, inserts, elements or framework. For example, the head can comprise an insert having holes that are engaged by the ball member shaft.

One or more body parts can comprise one or more holes, openings, grooves, recesses or cavities for containing or engaging with a part of the articulated joint, such as the socket, socket housing, socket body part insert or shaft of the ball member.

One or more body parts can comprise two or more connectable pieces. Such pieces can be snap-fitted or friction-fitted together or connected together with fasteners, such as adhesives or threaded bolts or screws, for example.

The manikin can be in the form of an adult, a child, an infant or a baby. Preferably, the manikin is in the form of a baby, from new born to less than about a year old. This is particularly the case for the fifth and sixth aspects of the invention.

The manikin of the third aspect can have other than the articulated joint described above connecting manikin body parts together. The joints can be of any suitable size, shape and construction. For example, a pin joint or a ball and socket arrangement could be used. As mentioned previously, one or more of these other joints types can be of unitary construction with the body parts and/or connectable pieces.

In some embodiments a pin joint could be used as an elbow joint to connect an upper arm and forearm together, such that these body parts move in a single plane. In some embodiments, a lower region of the upper arm can be shaped as a clevis, an upper region of the forearm can be shaped as a tongue, and the tongue can be pinned within the clevis using a locking pin (eg. an interscrew). In some embodiments, the forearm can have a recess or track located each side of the tongue, coinciding with the positioning of the clevis of the upper arm, thereby enabling the forearm to be moved from a fully extended position forwards and upwards towards the upper arm. The elbow joint can move in a single axis for approximately 90°. This range has been deliberately limited to mimic real-life by careful design of the geometry of the moulded body parts.

In some embodiments a pin joint could be used as a knee joint to connect an upper leg and lower leg together, such that these body parts move in a single plane. In some embodiments, a lower region of the upper leg can be shaped as a clevis, an upper region of the lower leg can be shaped as a tongue, and the tongue can be pinned within the clevis using a locking pin (eg. an interscrew). In some embodiments, the lower leg can have a recess or track each side of the tongue, coinciding with the positioning of the clevis of the upper leg, thereby enabling the leg to be moved from a fully extended position backwards and upwards towards the upper leg. The knee joint can move in a single axis for approximately 90°. This range has been deliberately limited to mimic real-life by careful design of the geometry of the moulded body parts.

In some embodiments the manikin comprises one or more of the following: a neck joint (the articulated joint); a waist joint (the articulated joint); a hip joint (double ball and socket joint arrangement); two knee joints (pin joints); two ankle joints (the articulated joints); two shoulder joints (double ball and socket joint arrangements); two elbow joints (pin joints); and two wrist joints (the articulated joints).

In a preferred embodiment the upper torso and lower torso can be connected by way of the articulated joint (waist joint). The waist joint can comprise a ball member comprising a ball with a shaft extending from opposed sides thereof. Each end of the shaft can be enlarged. The ball member can be a single machined plastic part. The waist joint can comprise a socket in the form of a socket housing within which the ball member rotates. The ball member can be in contact with an inner spherical surface of the socket housing. The socket housing can have a first opening through which one of the shaft ends can extend as well as a second opening through which another end of the shaft can extend. The shaft can be connected and retained within the upper torso. The socket housing, or part of the socket housing, can be of unitary construction with the lower torso.

In a preferred embodiment the neck joint can comprise a ball member comprising a ball with a shaft extending from opposed sides thereof. Each shaft end can comprise a spring plunger or pin which locates in a hole in the head (or neck area of the head) to attach the head to the upper torso. The ball member and spring plungers or pins can be machined plastic. The neck joint can include a socket in the form of a socket housing within which the ball member rotates. The ball member can be in contact with an inner spherical surface of the socket housing. The socket housing can have a first opening through which one of the shaft end can extend as well as a second opening through which the other shaft end can extend. The shaft can be connected to and retained within the head. The socket housing, or part of the socket housing, can be of unitary construction with the neck of the upper torso.

In a preferred embodiment the wrist and ankle joints can be similar arrangements in slightly different sizes. The socket housings can be made as stainless steel inserts. This is for reasons of strength and so that they may be moulded into the forearm/lower leg body parts.

Each wrist joint can comprise a ball member comprising a ball with a shaft extending from opposed sides thereof. Each shaft end can comprise a continuous passage for receiving a locking pin (eg. an interscrew) for pinning the ball member to the hand.

In a preferred embodiment each wrist joint can comprise a socket in the form of a socket housing within which the ball member rotates. The socket can comprise an arm pin insert extending from the socket housing. The ball member can be in contact with an inner spherical surface of the socket housing. The socket housing can have an opening through which one of the shaft ends can extend as well as a second opening through which the other shaft end can extend. The ball can be introduced into the socket housing by way of one of the openings (but preferably not the other). The socket of each wrist joint can be made of stainless steel. This is for reasons of strength and so that it can be moulded into the forearm.

Each ankle joint can comprise a ball member comprising a ball with a shaft extending from opposed sides thereof. Each shaft end can comprise a passage for receiving a locking pin (eg. an interscrew) which pins the ball member to the foot.

Each ankle joint can comprise a socket in the form of a socket housing within which the ball member rotates. The socket can comprise a leg pin insert extending from the socket housing. The ball member can be in contact with an inner spherical surface of the socket housing. The socket housing can comprise an opening through which one of the shaft ends can extend as well as a second opening through which the other shaft end can extend. The ball can be introduced into the socket housing by way of one of the openings (but preferably not the other). The socket of each ankle joint can be made of stainless steel. This is for reasons of strength and so that it can be moulded into the lower leg.

In a preferred embodiment each shoulder can comprise a double ball and socket joint arrangement. That is, the double ball and socket joint arrangement can comprise two balls connected to one another by way of a short joining member. The short joining member can be a linear shaft, pin or rod, for example. The arrangement can comprise a first socket housing located in the upper torso and a second socket housing located in an upper end of the upper arm. Each socket housing can be moulded into the body part. This arrangement can mimic the complex movement of a real shoulder with a reasonably small number of moving elements. The two balls and joining member can be machined stainless steel.

In a preferred embodiment the hip joint can comprise a double ball and socket arrangement. The hip joint can include a ball member pair, each comprising a ball with a flanged mounting shaft extending therefrom. The arrangement can comprise a threaded rod. Each flanged mounting shaft can have an internal threaded opening, enabling joining by the threaded rod and connection to the lower torso, whereby the flange of each mounting shaft can bear against a lower torso surface. Each ball member can be made of stainless steel. The hip joint can comprise a socket housing within which the ball member rotates. A socket housing can be located in an upper end of each upper leg. Each socket housing can be moulded into the body part.

In a preferred embodiment each elbow joint can comprise a pin joint. A lower end of each upper arm can be in the form of a clevis having a groove/slot for receiving a respective upper end of a forearm. The upper end of each of forearm can be in the form of a tongue. The clevis of each upper arm and the tongue of each forearm have coinciding openings for receiving a locking pin of the pin joint. The locking pin can be an interscrew. In this way, the forearm can move relative to the upper arm in a single plane. The forearm can have a recess or track each side of the tongue, coinciding with the positioning of the clevis of the upper arm, thereby enabling the forearm to be moved from a fully extended position forwards and upwards towards the upper arm.

In a preferred embodiment each knee joint can comprise a pin joint. A lower end of each upper leg can be in the form of a clevis having a groove/slot for receiving a respective upper end of a lower leg. The upper end of each lower leg can be in the form of a tongue. The clevis of each upper leg and the tongue of each lower leg can have coinciding openings for receiving a locking pin of the pin joint. The locking pin can be an interscrew. In this way, the lower leg can move relative to the upper leg in a single plane. The lower leg can have a recess or track each side of the tongue, coinciding with the positioning of the clevis of the upper leg, thereby enabling the leg to be moved from a fully extended position backwards and upwards towards the upper leg.

In a preferred embodiment the head can be manufactured as a moulded silicone rubber skin with a filler. The head can contain an insert, such as a plastic insert, with holes for retaining the shaft ends of the ball member of the neck joint.

In a preferred embodiment each upper arm can be made of moulded silicone rubber. An upper end of each arm can incorporate an integrally moulded socket housing of the shoulder joint. A lower end of each arm can incorporate an integrally moulded clevis of the pin joint.

In a preferred embodiment each forearm can be made of moulded silicone rubber. An upper end of each forearm can incorporate an integrally moulded tongue of the pin joint, and a lower end of each forearm can incorporate an arm pin insert of the socket of the wrist joint. Each forearm can comprise a recess or track, each side of the tongue, for the pin joint.

In a preferred embodiment each upper leg can be made of moulded silicone rubber. An upper end of each upper leg can incorporate an integrally moulded socket housing of the hip joint. A lower end of each upper leg can incorporate an integrally moulded clevis of the pin joint.

In a preferred embodiment each lower leg can be made of moulded silicone rubber. An upper end of each lower leg can incorporate an integrally moulded tongue of the pin joint, and a lower end of each lower leg can incorporate a leg pin insert of the socket of the foot joint. Each lower leg can comprise a recess or track each side of the tongue, for the pin joint.

In a preferred embodiment each hand can be made of moulded silicon rubber and each hand can incorporate the socket housing of the wrist joint. The shaft ends of the ball member can bear against opposing sides of the hand. A locking pin (eg. interscrew) can be extended through opposed openings in the hand to pin the ball member within the hand.

In a preferred embodiment each foot can be made of moulded silicon rubber and each foot can incorporate the socket housing of the ankle joint. The shaft ends of the ball member can bear against opposing sides of the foot. The locking pin (eg. interscrew) can be extended through opposed openings in the foot to pin the ball member within the foot.

In a preferred embodiment the upper torso can be made of moulded silicon rubber with embedded stainless steel reinforcement parts. The upper torso can be made in two longitudinal halves which can be fastened together. A lower region of the upper torso can have a recess or cavity for receiving a socket housing of the waist joint. The longitudinal halves can be fastened together to clamp the ball members/balls of the neck and shoulder joints within their respective socket housings. With regard to the waist joint, the shaft ends of the ball member can be snugly received within profiled grooves in the upper torso and can be held in place when the two longitudinal halves are fastened together.

In a preferred embodiment the lower torso can be made of moulded silicon rubber and can be of integral construction with part of the socket housing of the waist joint. The lower torso can have a midsection where a pubic bone would normally be in a person, a recess located each side of the midsection, and a passage extending through the midsection to each recess. When assembling the hip joint, a ball member can be placed within each recess and interconnected with the threaded rod via the midsection passage such that the flanges bear against opposing surfaces of the midsection.

The facial features of the manikin can resemble a real person, particularly a real baby. The weight of each body part can approximate that of a real person, particularly a real baby. The manikin can have any suitable skin colour or skin tone. Therefore, in many respects the manikin resembles and can mimic a real person, particularly a real baby.

With regard to the fifth and sixth aspects, a baby manikin can be used as a training or educational tool where use of a real baby would be impractical or inconvenient. Examples include, but are not limited to, educating or training healthcare workers, expectant parents or photographers—basically anyone who would need to work with babies. Further examples include, but are not limited to: midwives and midwife training; doulas; anyone engaging in early learning as a profession or training; retail demonstrations and trials for baby products; child care; antenatal classes and parental training; disabled parents to be; baby product development; display baby products at expos; ambulance staff training; to fit baby seats in cars; hospitals for training breast feeding and simulated bathing; dementia patients; colleges; universities; schools; paediatricians; physiotherapists; and, chiropractors.

Any of the features described herein can be combined in any combination with any one or more of the other features described herein within the scope of the invention.

BRIEF DESCRIPTION OF DRAWINGS

Various embodiments of the invention will be described with reference to the following drawings, in which.

DESCRIPTION OF EMBODIMENTS

Figure 1:
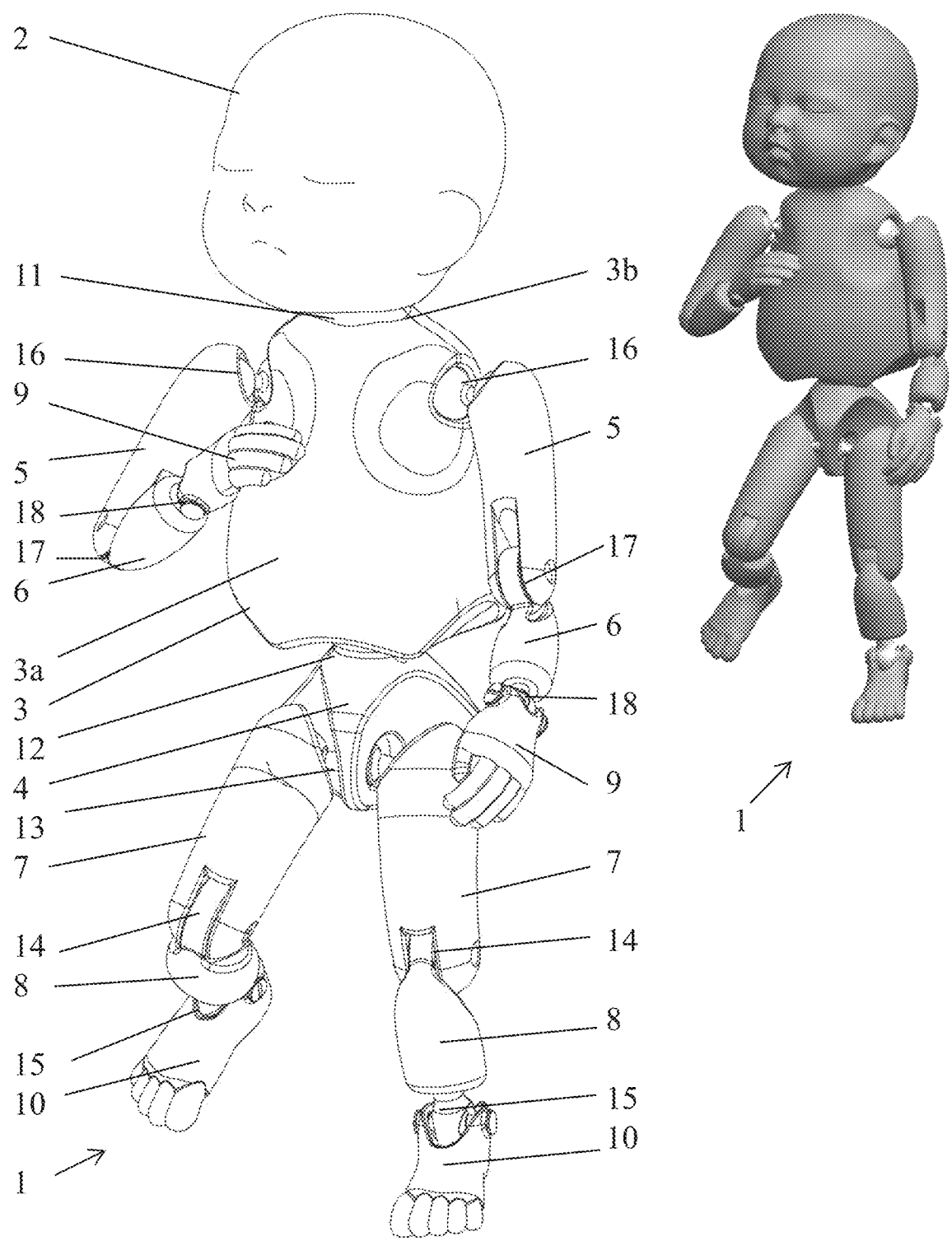
FIG. 1 shows, in perspective, a baby manikin both as a line drawing and as a rendered image, according to an embodiment of the present invention.
Figure 2:
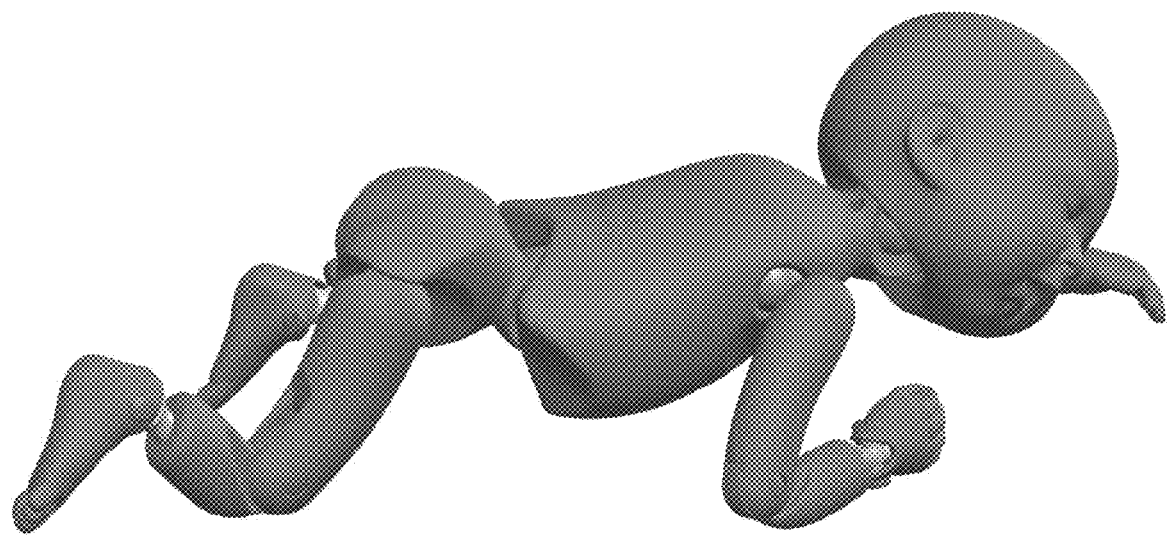
FIG. 2 shows, in perspective, the baby manikin of FIG. 1 but with its body parts in a different configuration.
Figure 2:
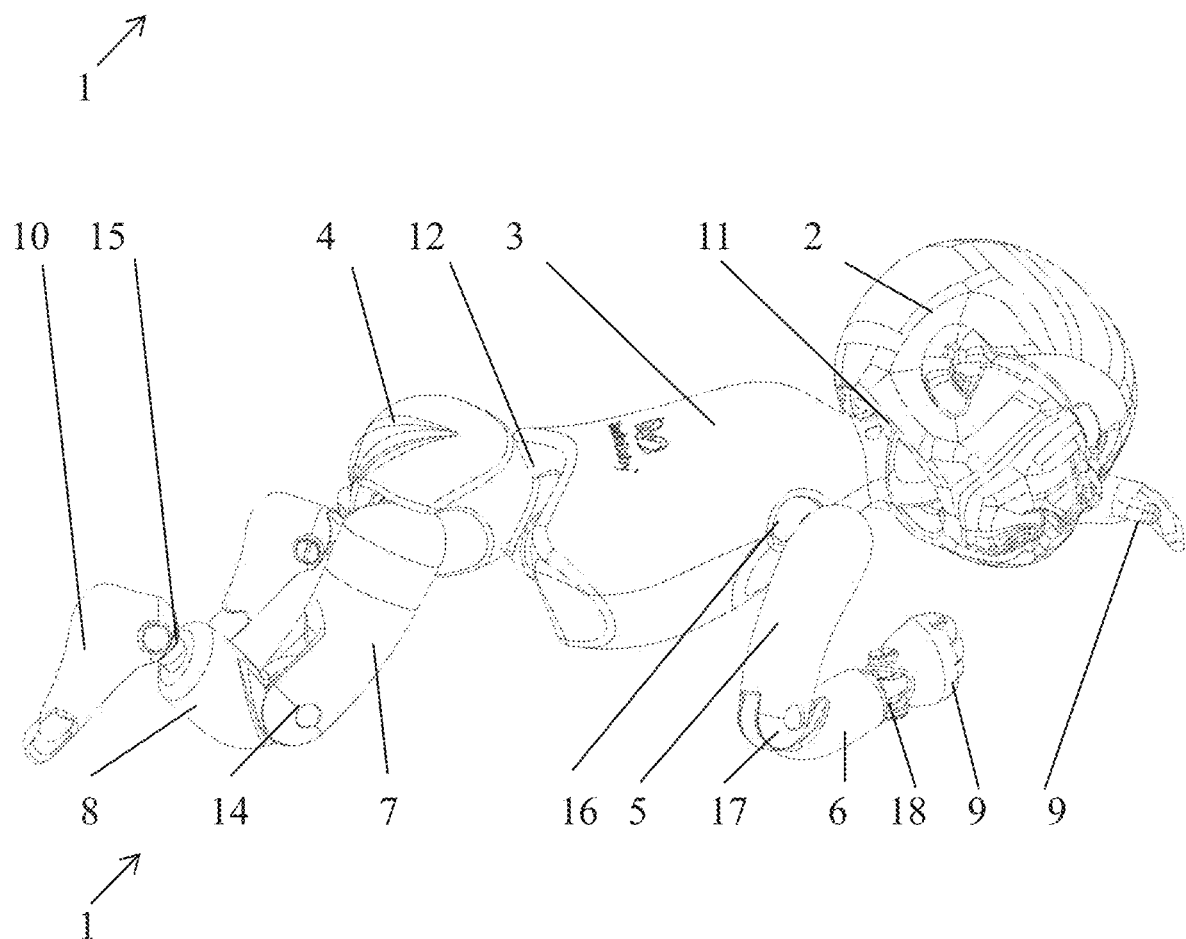
Figure 3:
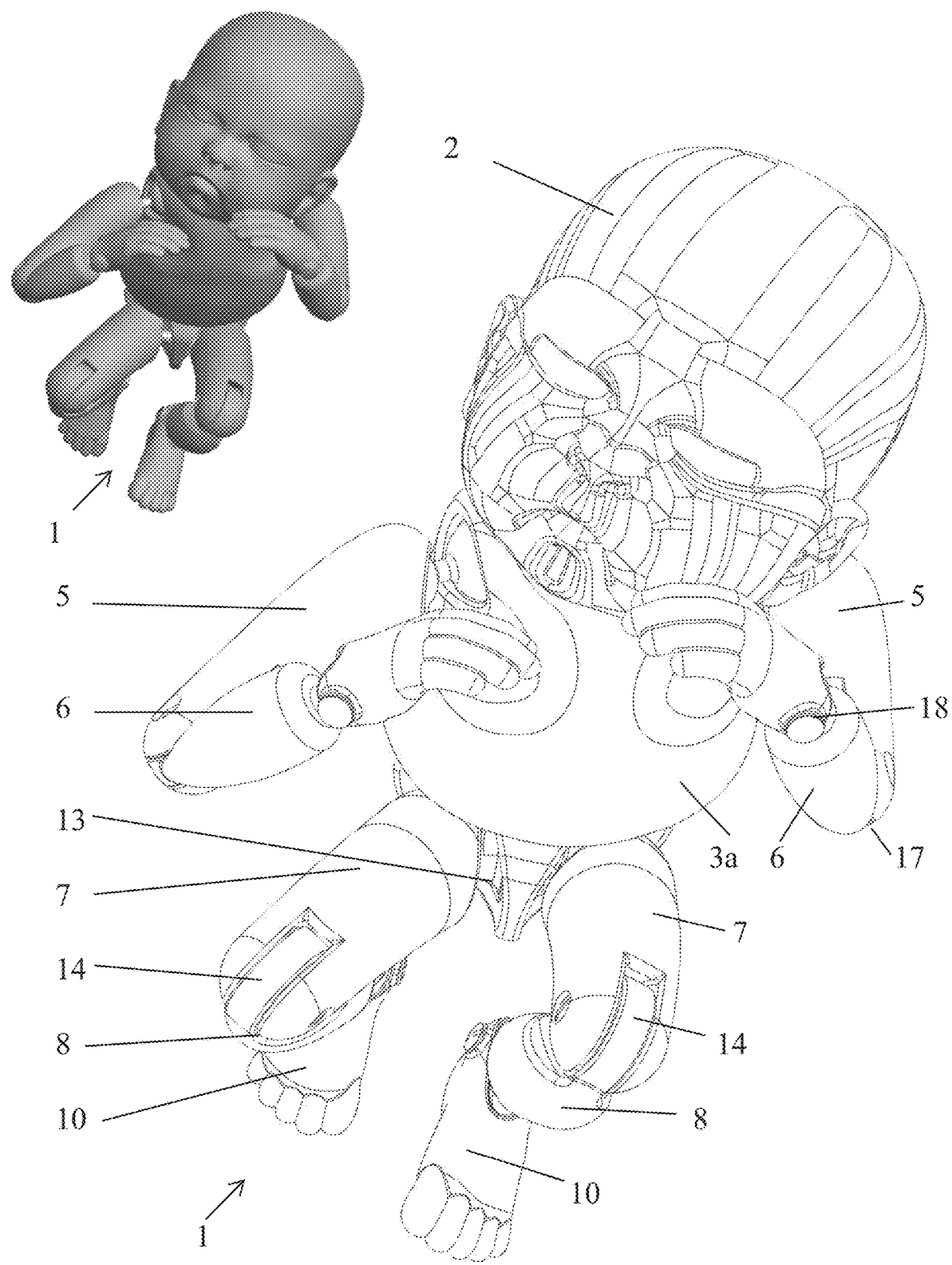
FIG. 3 shows, in perspective, the baby manikin of FIG. 1 but with its body parts in a different configuration.

The figures show a baby manikin 1 comprising body parts that are connected through an arrangement of articulated joints and other types of joints.

The manikin 1 has different general body parts, including a head 2, an upper torso 3 (chest 3a and neck 3b), a lower torso 4 (waist and buttock), a pair of upper arms 5, a pair of forearms 6, a pair of upper legs 7, a pair of lower legs 8, a pair of hands 9, and a pair of feet 10. These body parts are connected together by way of the joints. In some instances, the joints are, in part, of unitary construction with the body parts.

The baby manikin 1 includes a neck joint 11 (articulated ball and socket joint), a waist joint 12 (articulated ball and socket joint), a hip joint 13 (double ball and socket joint), two knee joints 14 (pin joints), two ankle joints 15 (articulated ball and socket joints), two shoulder joints 16 (double ball and socket joints), two elbow joints 17 (pin joints), and two wrist joints 18 (articulated ball and socket joints).

As seen in FIGS. 7 to 10, the upper torso 3 and lower torso 4 are connected by way of an articulated ball and socket waist joint 12. The waist joint 12 includes a ball member 120 comprising a ball 121 with ends of a shaft 122a, 122b extending from opposed sides thereof. Each end of each shaft 122a, 122b is enlarged. The ball member 120 is a single machined plastic part.

The waist joint 12 also includes a socket 125 in the form of a socket housing 126 within which the ball member 120 rotates. The ball 121 is in contact with an inner spherical surface of the socket housing 126. The socket housing 126 also has an outer surface. The socket housing 126 has a detachable closure 126a (see FIG. 9) such that the ball member 120 can be placed within. The detachable closure 126a has openings for receiving threaded fasteners so that the ball member 120 is clamped within the socket housing 126.

Figure 10:
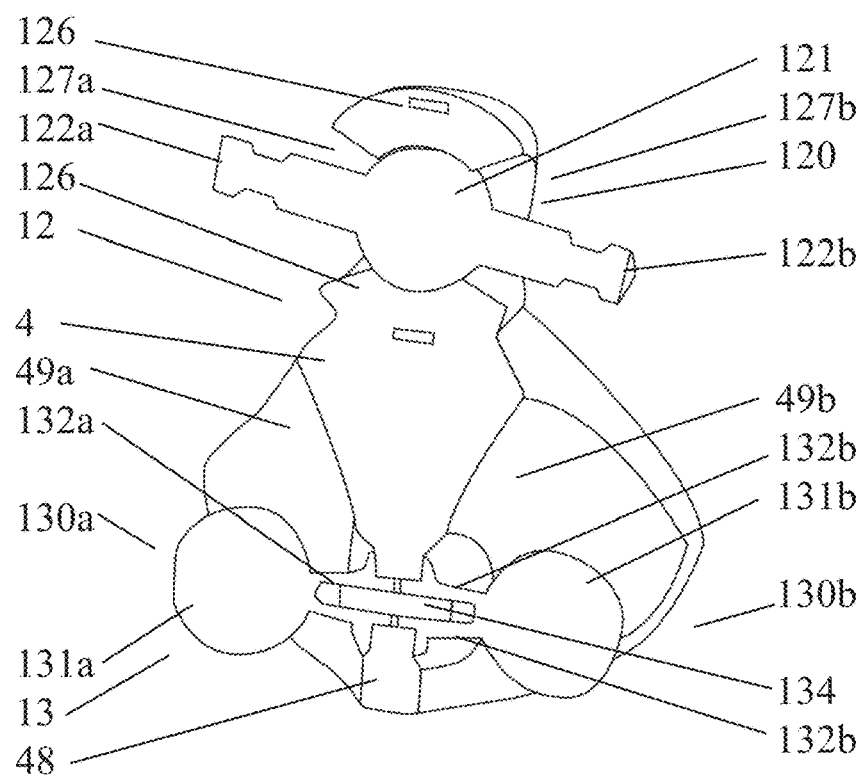
FIG. 10 is a cross-sectional view of the parts of the baby manikin shown in FIG. 9.

The socket housing 126 has a first generally circular opening 127a through which one of the shaft ends 122a extends as well as a second generally circular opening 127b through which the other shaft end 122b extends (see FIG. 10). The size and the shape of the openings 127a, 127b dictate the degree of movement allowed by the ball member 120. That is, the socket housing opening 127a, 127b limits the travel of that shaft end 122a, 122b in certain axes. By tuning the geometry of the shaft 122a, 122b and socket housing opening 127a, 127b it has been possible to design in the desired amount of joint travel in all axes. This type of joint 12 also features in the neck joint 11, wrist joints 18 and ankle joints 15.

Figure 4:
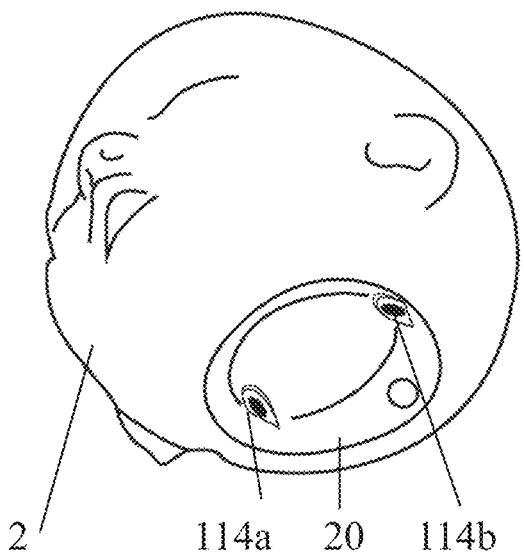
FIG. 4 shows, in perspective, a head of the baby manikin of FIG. 1.
Figure 6:
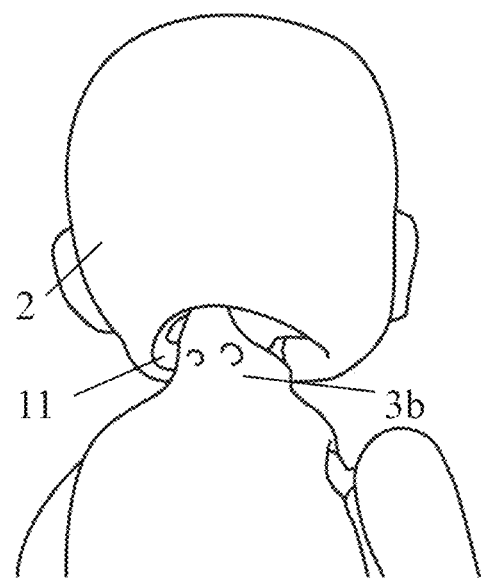
FIG. 6 shows, in perspective, parts of the baby manikin of FIG. 1, including an upper torso and head.
Figure 5:
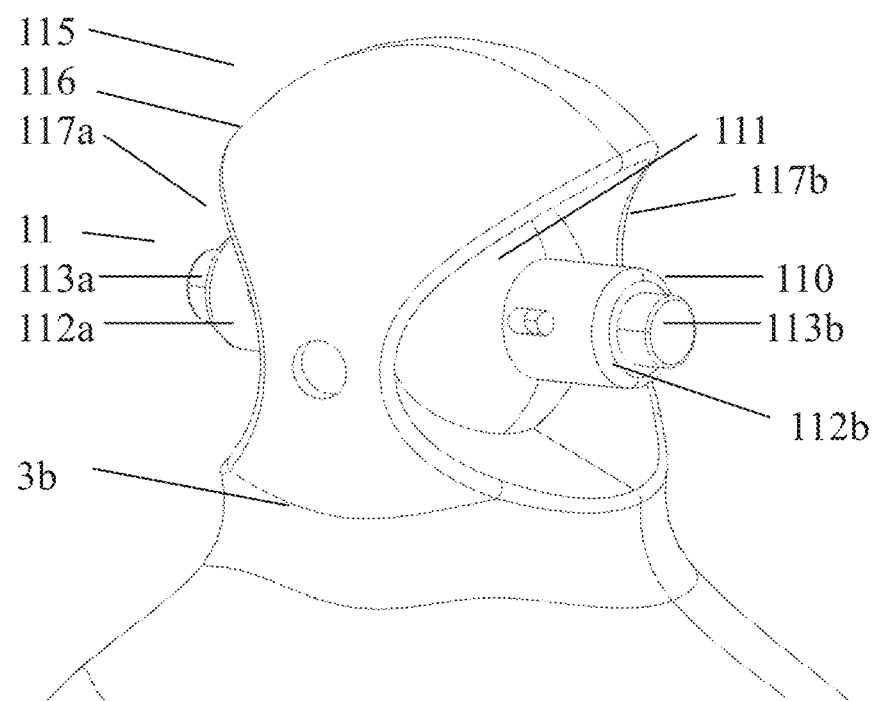
FIG. 5 shows, in perspective, parts of the baby manikin of FIG. 1, including an upper torso and neck joint.

The neck joint 11 is very similar to the waist joint 12. As seen in FIGS. 4 to 8 and 13, the neck joint 11 includes a ball member 110 comprising a ball 111 with ends of a shaft 112a, 112b extending from opposing sides thereof. An additional feature is that each shaft end 112a, 112b incorporates a spring plunger 113a, 113b which locates in a hole 114a, 114b in a rigid insert 20 in the underside (neck) of the head 2 to attach the head to the upper torso 3 (as seen in FIG. 4). The ball member 110 and spring plungers 113a, 113b are machined plastic.

The neck joint 11 also includes a socket 115 in the form of a socket housing 116 within which the ball member 110 rotates. The ball 111 is in contact with an inner spherical surface of the socket housing 116. The socket housing 116 also has an outer surface. The socket housing 116 has a first generally circular opening 117a through which one of the shaft ends 112a extends as well as a second generally circular 117b opening through which the other shaft end 112b extends (see FIG. 5). The size and the shape of the openings 117a, 117b dictate the degree of movement allowed by the ball member 110. That is, the socket housing opening 117a, 117b limits the travel of that shaft end 112a, 112b in certain axes.

The wrist 18 and ankle joints 15 are identical arrangements in slightly different sizes. These joints 18, 15 are also very similar to the waist 12 and neck 11 joints. The primary difference is that the socket housings of the wrist 18 and ankle 15 joints are made as stainless steel inserts. This is for reasons of strength and so that they can be moulded into the forearm 6 and lower leg 8.

Figure 12:
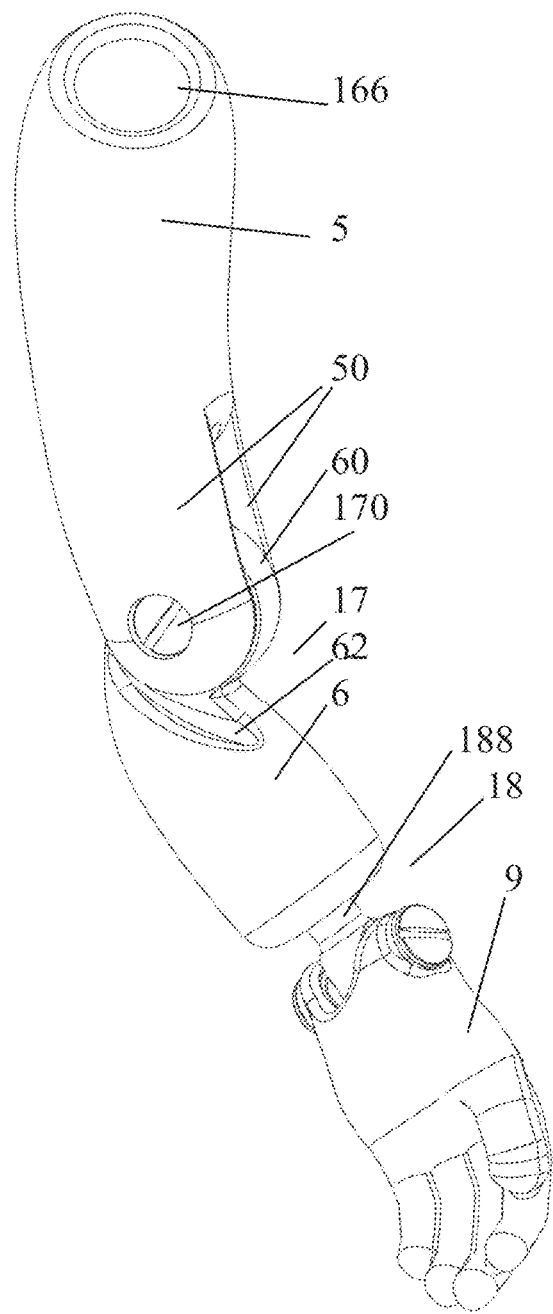
FIG. 12 shows, in perspective, parts of the baby manikin of FIG. 1, including an upper arm, forearm and hand, as well as various joints.
Figure 14:
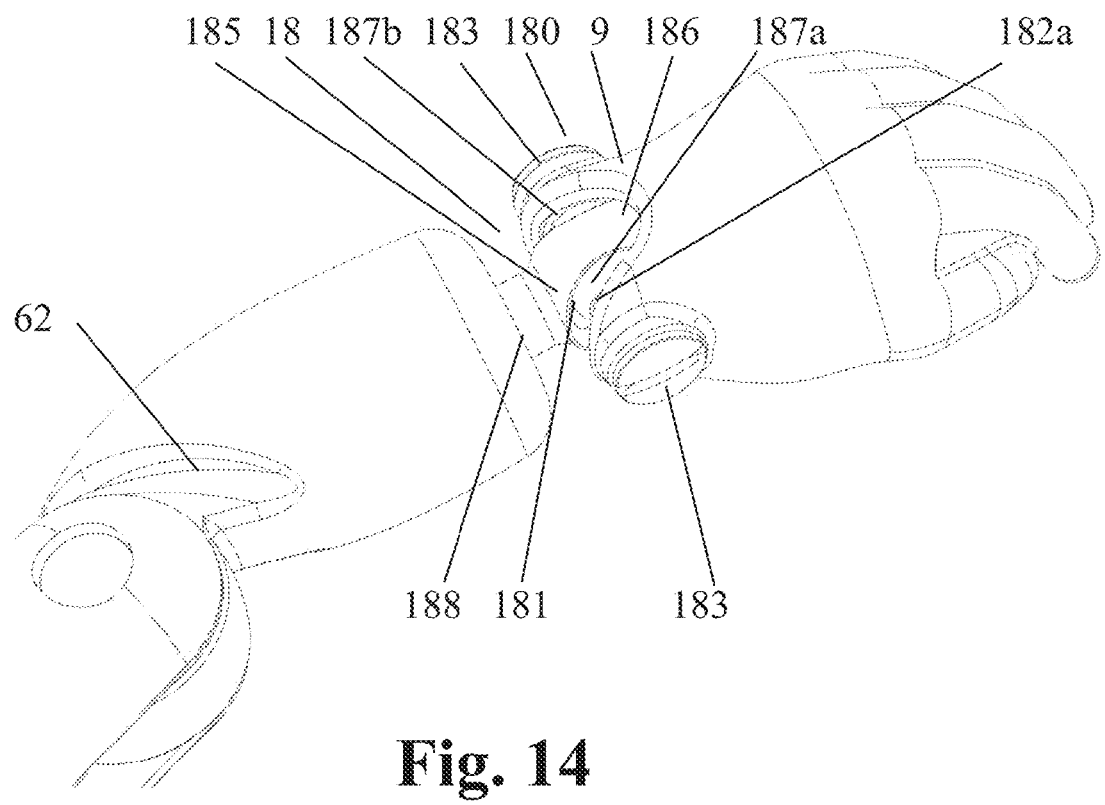
FIG. 14 shows, in perspective, parts of the baby manikin of FIG. 1, including a forearm, hand and wrist joint.
Figure 15:
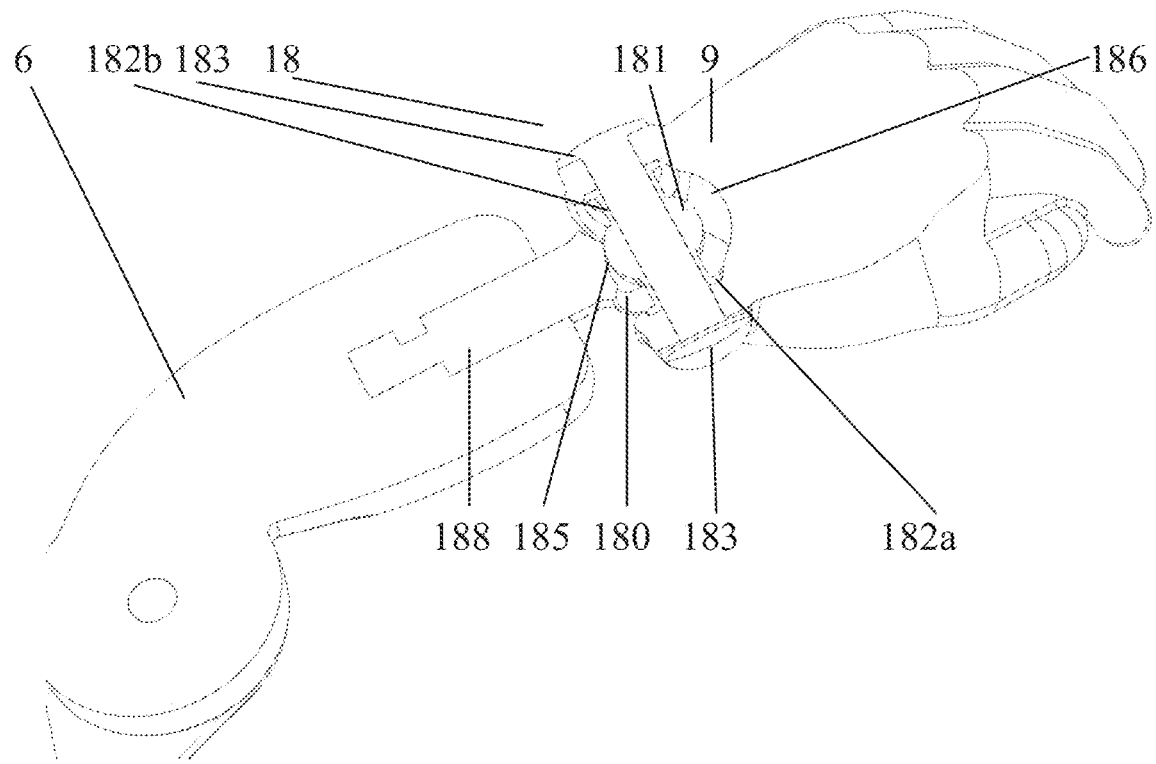
FIG. 15 is a cross-sectional view of the parts of the baby manikin shown in FIG. 14.

As seen in FIGS. 12, 14 and 15, each wrist joint 18 includes a ball member 180 comprising a ball 181 with a shaft end 182a, 182b extending from opposing sides thereof. The shaft ends bear against the sides of the hand. A differing feature is that each shaft end 182a, 182b and ball 181 has a continuous passage for receiving a locking pin 183—in this instance the locking pin being an interscrew 183, which pins the ball member 180 within and to the hand 9.

Each wrist joint 18 also includes a socket 185 in the form of a socket housing 186 within which the ball member 180 rotates. The socket 185 also includes an arm pin insert 188 extending from the socket housing 186. The ball 181 is in contact with an inner spherical surface of the socket housing 186. The socket housing 186 also has an outer surface. The socket housing 186 has a first generally circular opening 187a through which one of the shaft ends 182a extends as well as a second generally circular opening 187b through which the other shaft end 182b extends. One of the openings 187 enables the ball member 180 to be introduced and seated within the socket housing 186, whereas the other opening does not. The size and the shape of the openings 187a, 187b dictate the degree of movement allowed by the ball member 180. That is, the socket housing opening 187a, 187b limits the travel of that shaft end 182a, 182b in certain axes.

The socket 185 of each wrist joint 18, including the insert 188, is made of stainless steel. This is for reasons of strength and so that it can be moulded into the forearm 6.

Figure 13:
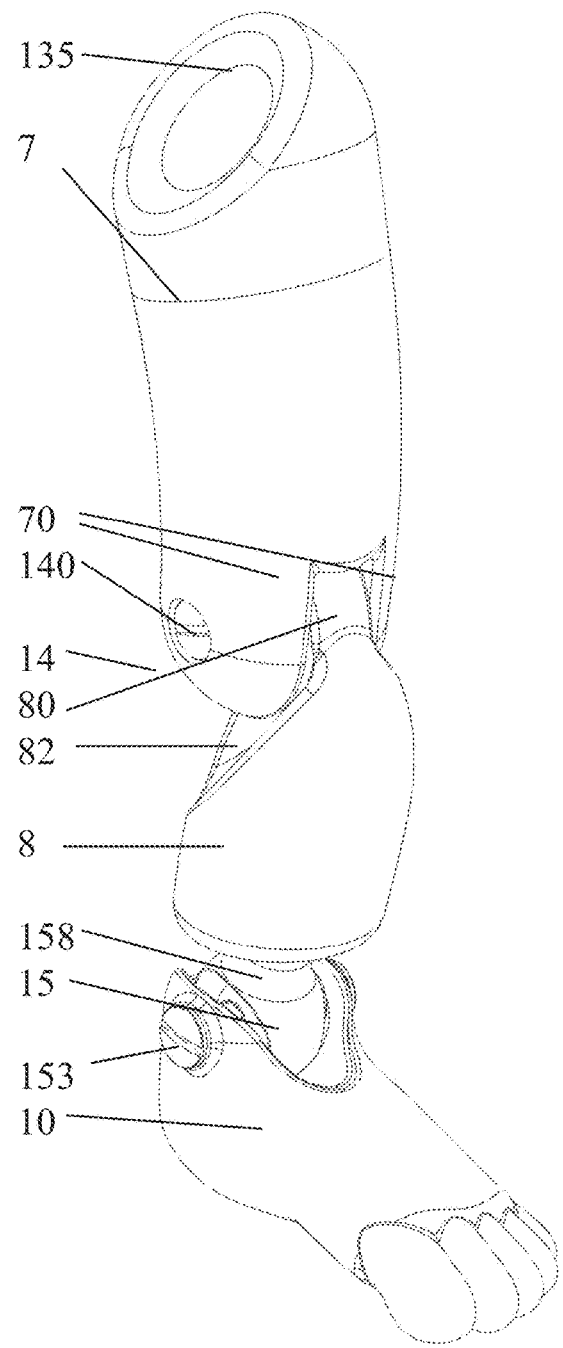
FIG. 13 shows, in perspective, parts of the baby manikin of FIG. 1, including an upper leg, lower leg and foot, as well as various joints.
Figure 16:
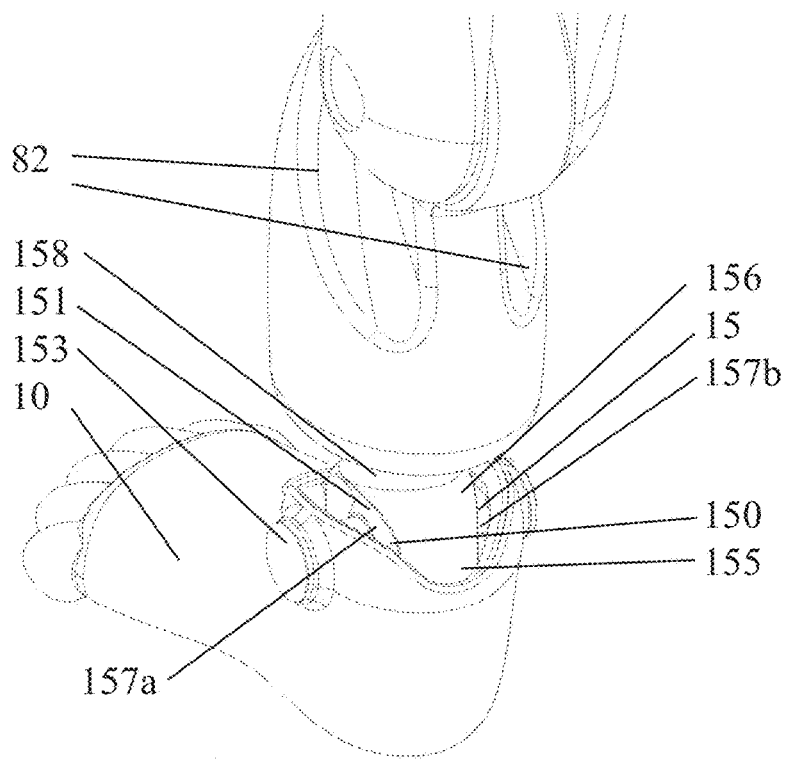
FIG. 16 shows, in perspective, parts of the baby manikin of FIG. 1, including a lower leg, foot and foot joint.
Figure 17:
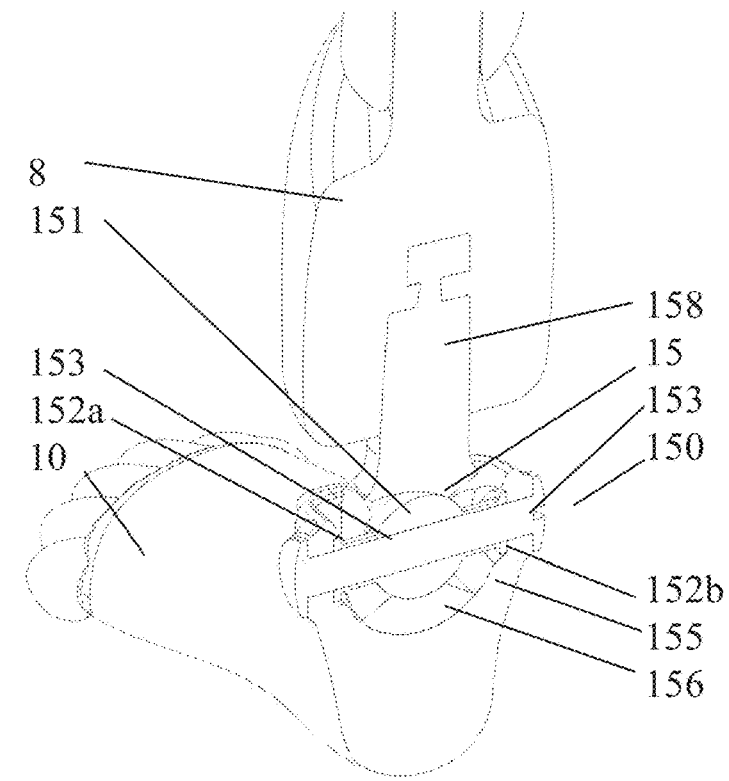
FIG. 17 is a cross-sectional view of the parts of the baby manikin shown in FIG. 16.
Figure 18:
FIGS. 18 and 19 show a baby manikin that is substantially the same as the manikin of FIG. 1 with its body parts in various configurations, closely mimicking natural movement of corresponding body parts of a real baby and closely mimicking a range of poses or postures of a real baby.
Figure 19:

As seen in FIGS. 13, 16 and 17, each ankle joint 15 includes a ball member 150 comprising a ball 151 with a shaft end 152a, 152b extending from opposing sides thereof. The shaft ends bear against opposed sides of the foot. Similar to the wrist joint 18, each shaft end 152a, 152b and ball 151 has a continuous passage for receiving a locking pin 153—in this instance the locking pin being an interscrew 153, which pins the ball member 150 within and to the foot 10.

Each ankle joint 15 also includes a socket 155 in the form of a socket housing 156 within which the ball member 150 rotates. The socket 155 also includes a leg pin insert 158 extending from the housing 156. The ball 151 is in contact with an inner spherical surface of the socket housing 156. The socket housing 156 also has an outer surface. The socket housing 156 has a first generally circular opening 157a through which one of the shaft ends 152a extends as well as a second generally circular opening 157b through which the other shaft end 152b extends. One of the openings 157 enables the ball member 150 to be introduced and seated within the socket housing 156, whereas the other opening does not. The size and the shape of the openings 157a, 157b dictate the degree of movement allowed by the ball member 150. That is, the socket housing opening 157a, 157b limits the travel of that shaft end 152a, 152b in certain axes.

The socket 155 of each ankle joint 15, including the insert 158, is made of stainless steel. This is for reasons of strength and so that it can be moulded into the lower leg 8.

As seen in FIGS. 7, 8, 11 and 12, each shoulder joint 16 comprises a double ball and socket joint arrangement 16. That is, the double ball and socket joint arrangement 16 includes two balls 160a, 160b connected to one another by way of a short joining member 161 (made from machined stainless steel). The arrangement 16 also includes a first socket housing 165 located in the upper torso 3 and a second socket housing 166 located in an upper end of the upper arm 5 (see FIG. 12). This arrangement mimics the complex movement of a real shoulder with a reasonably small number of moving elements.

As seen in FIGS. 7-11, the hip joint 13 comprises a double ball and socket joint arrangement 13. The hip joint 13 includes a ball member pair 130a, 130b, each comprising a ball 131a, 131b with a flanged mounting shaft 132a, 132b extending therefrom. The arrangement 13 also includes a threaded rod 134 (see FIG. 10). Each flanged mounting shaft 132a, 132b has an internal threaded opening, enabling joining by the threaded rod 134 and connection to the lower torso 4, whereby the flange of each mounting shaft 132a, 132b bears against a lower torso 4 surface, as seen in FIG. 10. Each ball member 130a, 130b is made of stainless steel.

The hip joint 13 also has a socket housing 135 within which the ball 131a, 131b rotates. A socket housing 135 is located in an upper end of each upper leg 7 (see FIG. 13).

Figure 11:
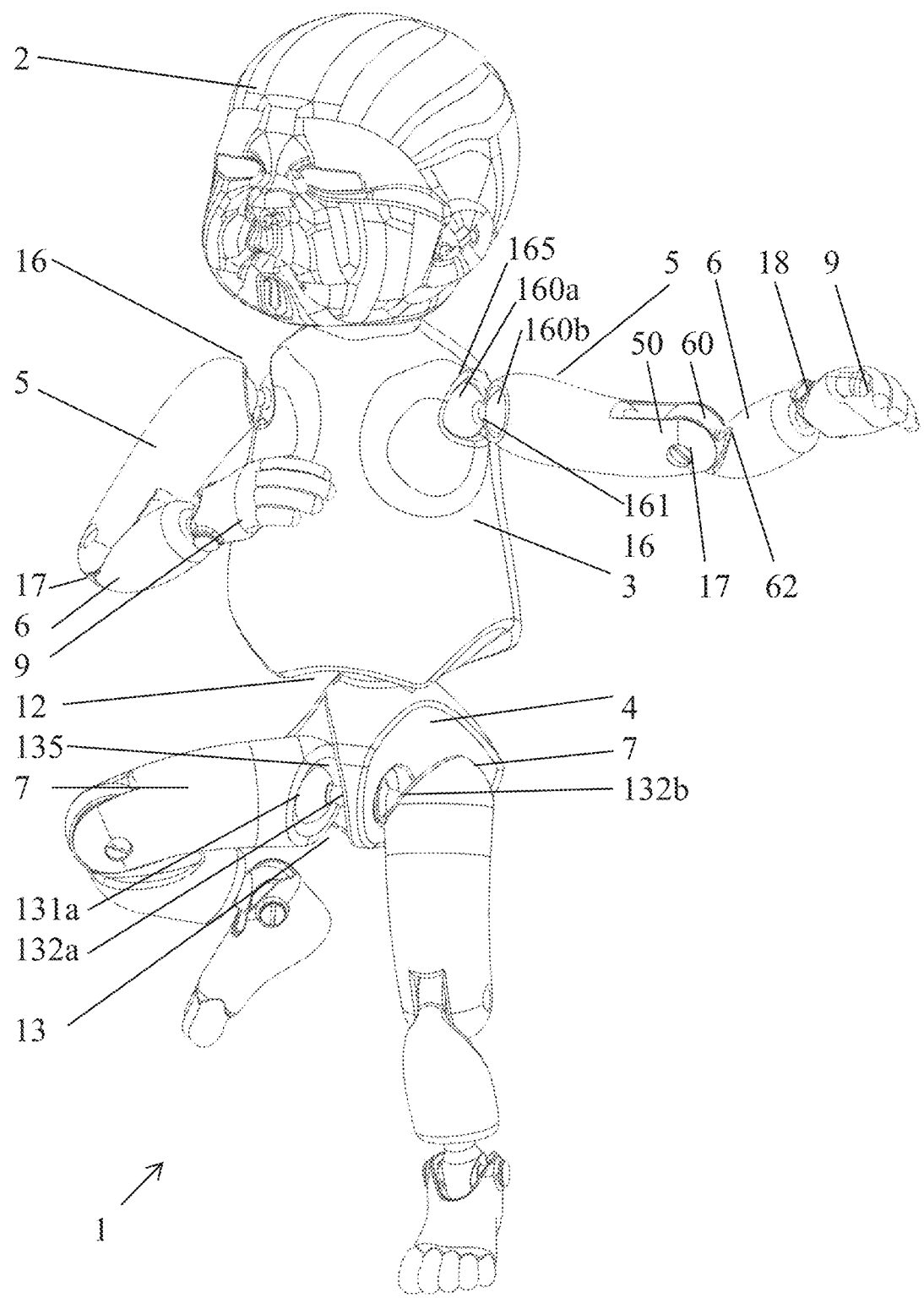
FIG. 11 shows, in perspective, the baby manikin of FIG. 1 but in a different configuration.

As seen in FIGS. 11 and 12, each elbow joint 17 comprises a pin joint 17. A lower end of each upper arm 5 is in the form of a clevis 50 having a groove/slot for receiving a respective upper end of a forearm 6. The upper end of each of forearm 6 is in the form of a tongue 60. The clevis 50 of each upper arm 5 and the tongue 60 of each forearm 6 have coinciding openings for receiving a locking pin 170 of the pin joint 17. The locking pin is an interscrew 170 (see FIG. 12).

Each forearm 6 has a pair of recesses or tracks 62 with a recess or track 62 located each side of the tongue 60, coinciding with the positioning of the clevis 50 of the upper arm 5, thereby enabling the forearm 6 to be moved forwards and upwards towards the upper arm 5.

As seen in FIG. 13, each knee joint 14 comprises a pin joint 14. A lower end of each upper leg 7 is in the form of a clevis 70 having a groove/slot for receiving a respective upper end of a lower leg 8. The upper end of each lower leg 8 is in the form of a tongue 80. The clevis 70 of each upper leg 7 and the tongue 80 of each lower leg 8 have coinciding openings for receiving a locking pin 140 of the pin joint 14. The locking pin is an interscrew 140.

Each lower leg 8 has a pair of recesses or tracks 82 with a recess or track 82 located each side of the tongue 80, coinciding with the positioning of the clevis 70 of the upper leg 7, thereby enabling the lower leg 8 to be moved backwards and upwards towards the upper leg 7.

The head 2 is manufactured as a moulded silicone rubber skin with a filler. The rigid insert 20 in the underside of the head 2 is made of plastics material (see FIG. 4).

Each upper arm 5 is made of moulded silicone rubber. An upper end of each arm 5 incorporates an integrally moulded socket housing 166 of the shoulder joint 16. A lower end of each arm 5 incorporates an integrally moulded clevis 50 of the pin joint 17.

Each forearm 6 is made of moulded silicone rubber. An upper end of each forearm 6 incorporates an integrally moulded tongue 60 of the pin joint 17, and a lower end of each forearm 6 incorporates the arm pin insert 188 of the socket 185 of the wrist joint 18.

Each hand 9 is made of moulded silicon rubber and each hand 9 incorporates the socket housing 186 of the wrist joint 18. The locking pin/interscrew 183 is extended through opposed openings in the hand 9 to pin the ball member 180 within the hand 9.

Similarly, each foot 10 is made of moulded silicon rubber and each foot 10 incorporates the socket housing 156 of the ankle joint 15. The locking pin/interscrew 153 is extended through opposed openings in the foot 10 to pin the ball member 151 within the foot 10.

Figure 7:
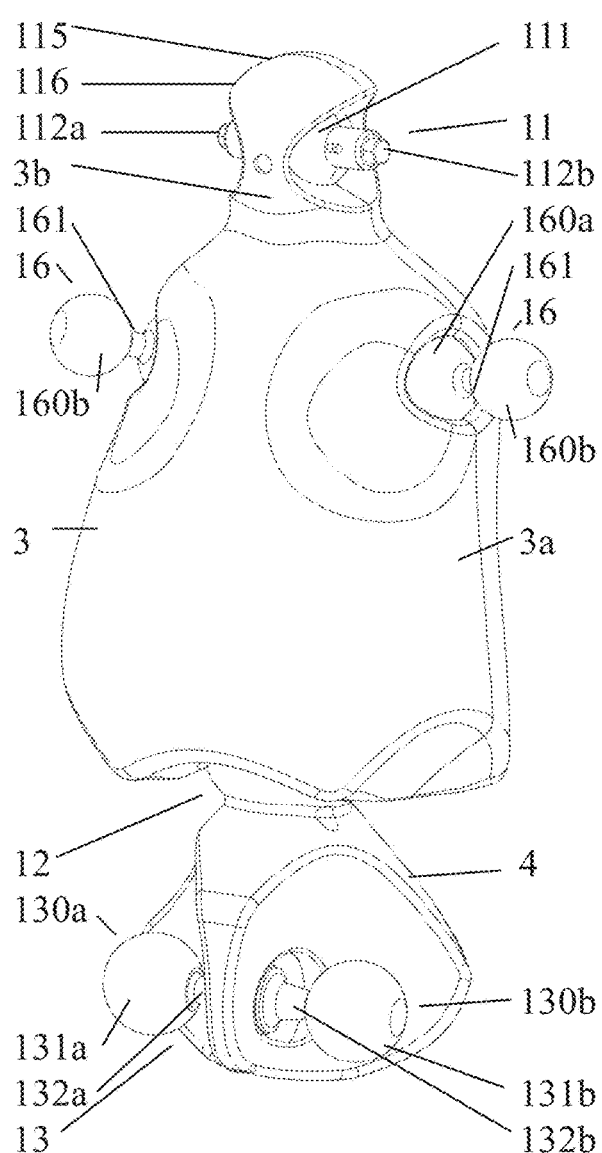
FIG. 7 shows, in perspective, parts of the baby manikin of FIG. 1, including an upper torso and lower torso and various joints, including articulated neck and waist joints.

The upper torso 3 is made of moulded silicon rubber with embedded stainless steel reinforcement parts, made in two longitudinal halves which can be fastened together using threaded fasteners. See FIGS. 7 and 8. A lower region of the upper torso 3 has a cavity for receiving the socket housing 126 of the waist joint 12. The longitudinal halves can be fastened together to clamp the ball members/balls of the neck 11 and shoulder joints 16 within their respective socket housings. With regard to the waist joint 12, the shaft ends 122a, 122b of the ball member 121 are snugly received within profiled grooves in the upper torso (as seen in FIG. 8) and are held in place when the two longitudinal halves are fastened together (as seen in FIG. 7).

The lower torso 4 is made of moulded silicon rubber and is of integral construction with part of the socket housing 126 of the waist joint 12. The lower torso 4 has a midsection 48 where a pubic bone would normally be in a person, a recess 49a, 49b located each side of the midsection 48, and a passage extending through the midsection 48 to each recess 49a, 49b.

When assembling the hip joint 12, a ball member 130a, 130b is placed within each recess 49a, 49b and interconnected with a threaded rod 134 such that flanges of the flanged mounting shafts 132a, 132b bear against opposing surfaces of the midsection 48, as seen in FIG. 10.

Figure 8:
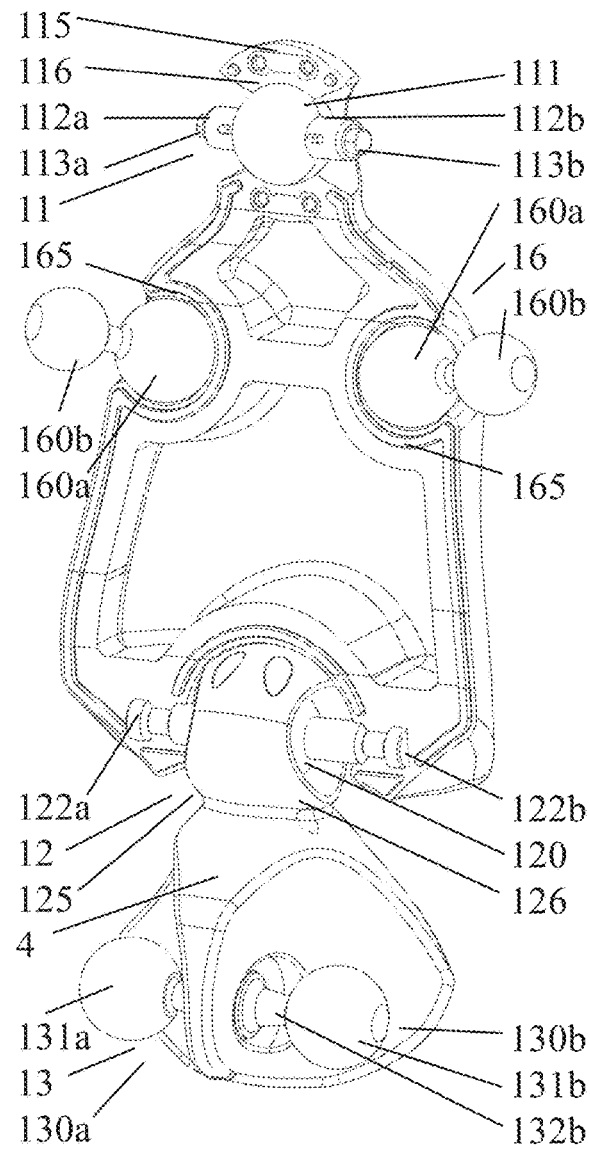
FIG. 8 is the same as that shown in FIG. 7, but lacking part of the upper torso.
Figure 9:
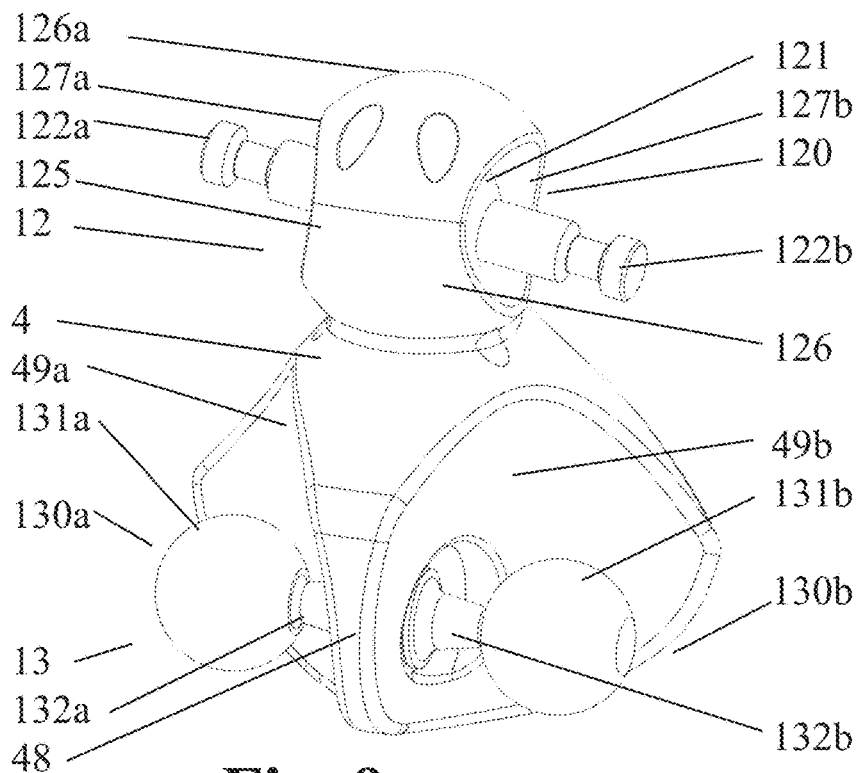
FIG. 9 shows, in perspective, parts of the baby manikin of FIG. 1, including an articulated waist joint and a hip joint.

In order to assemble the manikin 1 the ball members/balls of the neck joint 11 and shoulder joints 16 are placed within their respective socket housings 116, 165 within one half of the upper torso 3, as shown in FIG. 8. The ball member 120 of the waist joint 12 is placed within its socket housing 126 and then the detachable closure of the socket housing 126 is fastened in place, as shown in FIG. 9. The shaft ends 122a, 122b of the ball member 120 of the waist joint 12 are then positioned within the grooves in the upper torso 3. The two halves of the upper torso 3 are then fastened together to clamp those ball members 160a, 120 in position, as shown in FIG. 7.

The hip joint 12 can be assembled prior to or after connection to the upper torso 3. This would involve placing a ball member 130a, 130b within each recess and interconnecting them with the threaded rod 134.

The head 2 can be connected to the shaft ends 112a, 112b of the ball member 110 of the neck joint 11 by way of the spring loaded plungers 113a, 113b whereby the plungers are retracted and then released to locate within the holes 114a, 114b of the rigid plastic insert 20 of the head 2.

The upper arms 5 and forearms 6 can be assembled by way of fixing each tongue 60 within its respective clevis 50 using the locking pin 170.

The upper legs 7 and lower legs 8 can be assembled by way of fixing each tongue 80 within its respective clevis 70 using the locking pin 140.

Each foot 10 and hand 9 can be connected to its respective forearm 6 or lower leg 8 by way of pinning each ball member 180, 150 within the foot 10 or hand 9 using a locking pin 183, 153.

The ball 160b of each shoulder joint 16 is snap-fitted within its respective socket housing 166 of each upper arm 5.

The ball members 131a, 131b of the hip joint 13 are snap-fitted within their respective socket housing 135 of each upper leg 7.

The manikin 1 comprises a number of moulded body parts connected through an arrangement of pin joints and ball and socket joints. The articulated ball and socket joints are specially designed to limit travel in certain axes, and some of the body parts are shaped to cooperate with those joints or with one another, thereby enabling the manikin 1 to be configured and postured to mimic lifelike poses and body postures of a real baby (although with some differences and limitations). The arrangement of joints has been designed to mimic the actual movement of a newborn baby to the extent that it may be required for life-like poses in the studio photography scenario or for use as a training aid (e.g. by health practitioners or expectant parents). In this regard, see FIGS. 1 to 3, 11, 18 and 19.

As previously mentioned, the ball member 110 and socket housing 116 of the articulated neck joint 11 are designed to limit travel in certain axes as well as to cooperate with the moulded shape of the head 2 and upper torso 3, such that the head 2 can be moved relative to the upper torso 3 in a manner to mimic natural movement range by a baby.

The torso, comprising the upper torso 3 and lower torso 4, is articulated to mimic the range of movement provided by the spine. In this instance, the ball member 120 and socket housing 126 of the articulated waist joint 12 are designed to limit travel in certain axes as well as to cooperate with the moulded shape of the upper torso 3 and lower torso 4, such that the torso body parts can be moved relative to each other in a manner to mimic natural movement by a baby.

Regarding the shoulder joint arrangement 16, the first ball 160a and socket joint 165 (upper torso side) allows movements such as "shrugging" and reaching across the body. The second ball 160b and socket joint 166 (upper arm 5) allows reaching in all directions and twisting of the arm.

For the hip joint 13, careful design of the geometry, being the flanged shaft 132a, 132b at the base of each ball 131a, 131b and the moulded surfaces of the lower torso 4 and upper legs 7, limits the travel to the required amount in all axes.

Regarding the hands 9 and forearms 6, the ball member 180 and socket housing 186 of the wrist joints 18 are designed to limit travel in certain axes as well as to cooperate with the moulded shape of the hands 9 and forearms 6, such that they can be moved relative to each other in a manner to mimic natural movement by a baby.

Regarding the feet 10 and lower legs 8, the ball member 151 and socket housing 156 of the ankle joints 15 are designed to limit travel in certain axes as well as to cooperate with the moulded shape of the feet 10 and lower legs 8, such that they can be moved relative to each other in a manner to mimic natural movement by a baby.

With regard to the elbow 17 and knee 14 joints, each of these can move in a single axis for approximately 90°. This range has been deliberately limited to mimic real-life by careful design of the geometry of the moulded body parts.

The facial features of the manikin resemble a real baby. The weight of each body part also resembles that of a real baby. Therefore, in many respects the manikin resembles and can mimic a real baby.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect.

The invention claimed is:

1. An articulated joint for a manikin, wherein the joint comprises:
   a ball member comprising a ball and a shaft fixed to the ball and extending from opposed sides thereof, wherein a first end of the shaft located at one side of the ball and a second end of the shaft located at the opposed side of the ball are connected to, connectable to or part of a first body part of a manikin, and any movement of the ball causes movement of both said shaft ends with the ball; and
   a socket connected, connectable to or part of a second body part of a manikin, wherein the socket comprises a socket housing within which the ball is located and moves, and the socket housing has at least one opening through which the shaft extends, wherein:
   the socket housing limits movement of the shaft in certain axes such that the first and second body parts are configurable to (1) closely mimic natural movement of corresponding first and second body parts of a real person and/or (2) closely mimic a range of poses or postures of a real person;
   the first end of the shaft extends from a surface of the ball and the second end of the shaft extends from an opposed surface of the ball, and the first and second shaft ends extend along a common axis; and
   the first and second ends of the shaft each contain a passage adapted to receive a biased plunger, rod, pin, projection or other type of male formation such that the plunger, rod, pin, projection or other type of male formation is extendible from a retracted position so as to engage a hole, recess, channel, groove or other type of female formation in the first body part so as to hold the ball member in place.

2. The articulated joint of claim 1, wherein a shape of the first body part and/or a shape of the second body part further limit movement of the first and second body parts relative to each another such that the first and second body parts are configurable to (1) closely mimic natural movement of the corresponding first and second body parts of a real person and/or (2) closely mimic a range of poses or postures of a real person.

3. The articulated joint of claim 1, wherein the first and second ends of the shaft each contain a passage adapted to receive a mounting pin or threaded fastener so as to connect the first and second ends to the first body part.

4. The articulated joint of claim 1, wherein the socket housing comprises a first opening through which the first shaft end extends and a second opening through which the second shaft end extends, wherein the size and the shape of said openings dictate the degree of movement allowed by the ball member.

5. The articulated joint of claim 1, wherein the socket comprises a body part insert in the form of a shaft, rod or pin that extends from the socket housing and extends within or is incorporated into the second body part.

6. The articulated joint of claim 1, wherein the first and second body parts comprise: (1) a head and upper torso; (2) an upper torso and lower torso; (3) a forearm and a hand; or (4) a lower leg and a foot.

7. The articulated joint of claim 1, wherein the manikin is in the form of a baby.

8. A manikin comprising two or more body parts connected together using the articulated joint according to claim 1.

9. The manikin of claim 8, wherein the manikin is in the form of a baby.

10. A method of constructing a manikin, said method comprising the step of connecting together body parts of the manikin using the articulated joint of claim 1.

* * * * *